(12) United States Patent
Xiang (10) Patent No.: US 9,455,579 B2
(45) Date of Patent: Sep. 27, 2016

(54) USB CHARGER FOR AN ELECTRONIC CIGARETTE

(71) Applicant: Zhiyong Xiang, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 448 days.

(21) Appl. No.: 14/068,180

(22) Filed: Oct. 31, 2013

(65) Prior Publication Data

US 2015/0027466 A1    Jan. 29, 2015

(30) Foreign Application Priority Data

Jul. 23, 2013   (CN) .......................... 2013 1 0312286

(51) Int. Cl.
   *H02J 7/00*   (2006.01)

(52) U.S. Cl.
   CPC ............ *H02J 7/0013* (2013.01); *H02J 7/0054* (2013.01); *H02J 2007/0062* (2013.01)

(58) Field of Classification Search
   CPC .................................................... H02J 7/0054
   See application file for complete search history.

(56) References Cited

U.S. PATENT DOCUMENTS

| | | | | |
|---|---|---|---|---|
| 5,708,351 A * | 1/1998 | Takamoro | ............. | H02J 7/0065 307/150 |
| 6,255,804 B1 * | 7/2001 | Herniter | .................... | H02J 7/35 320/137 |
| 2007/0182368 A1 * | 8/2007 | Yang | ..................... | H01M 2/105 320/110 |
| 2008/0278086 A1 * | 11/2008 | Chitta | ................ | H05B 41/2886 315/224 |
| 2010/0045237 A1 * | 2/2010 | Liu | ........................... | H02J 7/04 320/128 |
| 2011/0265806 A1 * | 11/2011 | Alarcon | ................... | A24F 47/00 131/273 |
| 2012/0227753 A1 * | 9/2012 | Newton | ................. | A24F 47/008 131/347 |
| 2014/0083443 A1 * | 3/2014 | Liu | ........................ | H02J 7/0044 131/329 |
| 2014/0292278 A1 * | 10/2014 | Wu | ....................... | H02J 7/0003 320/112 |
| 2015/0001926 A1 * | 1/2015 | Kageyama | ............ | B60R 16/033 307/10.1 |
| 2015/0189916 A1 * | 7/2015 | Wu | ........................ | A24F 47/008 219/510 |
| 2015/0201676 A1 * | 7/2015 | Shin | ....................... | A24F 47/008 131/329 |

FOREIGN PATENT DOCUMENTS

| | | | | |
|---|---|---|---|---|
| WO | WO2013125170 | * | 7/2013 | ........... B60R 16/033 |
| WO | WO2014017794 A1 | * | 1/2014 | ........... A24F 47/008 |

OTHER PUBLICATIONS

WO2014017794A1—translation, Shin,Jan. 2014.*
WO2013125170—translation, Kageyama,Jul. 2013.*

* cited by examiner

*Primary Examiner* — Drew A Dunn
*Assistant Examiner* — Tynese McDaniel
(74) *Attorney, Agent, or Firm* — Tim Tingkang Xia, Esq.; Locke Lord LLP (57) ABSTRACT

A USB charger for an electronic cigarette includes a first interface, a control module and a second interface and a built-in battery. The control module is connected to the first interface, the second interface and the built-in battery respectively. The first interface is configured to connect an external power source so as to provide a power supply. The second interface is configured to connect a battery rod of an external electronic cigarette. The control module is configured to charge the battery rod of the electronic cigarette and the built-in battery simultaneously by using the external power source, or control the built-in battery to charge the battery rod of the electronic cigarette, based on the access state of the external power source at the first interface. The electronic cigarette can be charged by the USB charger even if there is no external power source.

15 Claims, 6 Drawing Sheets

Figure 9

USB CHARGER FOR AN ELECTRONIC CIGARETTE

CROSS-REFERENCE TO RELATED APPLICATIONS

This non-provisional application claims priority under 35 U.S.C. §119(a) on Patent Application No. 201310312286.2, filed in P.R. China on Jul. 23, 2013, the entire contents of which are hereby incorporated by reference.

FIELD OF THE APPLICATION

The present application relates to the field of electronic cigarette, and more particularly relates a USB charger for an electronic cigarette.

BACKGROUND OF THE APPLICATION

Generally, traditional electronic cigarettes are supplied powers from rechargeable batteries. The rechargeable batteries need to be recharged when they are run out of powers since the powers stored in the rechargeable batteries are limited. USB chargers are widely used resulted from the advantages in carrying and utilization.

However, traditional USB chargers don't have batteries built in, so they can only charge the battery rod in the electronic cigarette via connecting external power sources. If a user is traveling outdoors, in which case lacking of power source, the electronic cigarette can't be charged. Therefore, the user can't use the electronic cigarette conveniently, which can't meet the user's demand.

SUMMARY OF THE APPLICATION

The object of the present application is to provide a USB charger for an electronic cigarette, aiming at the drawbacks that the USB chargers in the prior art can charge the battery rod in the electronic cigarette only if there is an external power source connected.

The technical schemes to solve the above technical problems are as follows.

In one embodiment, a USB charger for an electronic cigarette is provided, which comprises a first interface, a control module and a second interface, wherein the USB charger further comprises a built-in battery, the control module is connected to the first interface, the second interface and the built-in battery respectively; the first interface is configured to connect an external power source so as to provide a power supply; the second interface is configured to connect a battery rod of an external electronic cigarette; the control module is configured to charge the battery rod of the electronic cigarette and the built-in battery simultaneously by using the external power source, or control the built-in battery to charge the battery rod of the electronic cigarette, based on the access state of the external power source at the first interface.

In another embodiment, the USB charger further comprises a charge managing module that is connected between the first interface and the built-in battery, when the first interface is connected to the external power source, the external source is outputted to the control module via the first interface to provide the power supply to the battery rod in the electronic cigarette, and the charge managing module is configured to control the external power source to charge the built-in battery; when there isn't any external power source connected to the first interface, the built-in battery charges the battery rod of the electronic cigarette directly via the control module.

In this embodiment, the charge managing module comprises a charge managing circuit chip and a first capacitor, the port BAT of the charge managing circuit chip is electronically connected to one end of the first capacitor and the positive pole of the built-in battery, the other end of the first capacitor is connected to the negative pole of the built-in battery. The model of the charge managing circuit chip is VA7204.

In this embodiment, the control module comprises a voltage boost control circuit and a first diode, the voltage boost control circuit is connected to the second interface, the anode of the first diode is connected to the first interface, the cathode of the first diode is connected to the voltage boost control circuit, the first diode is configured to prevent the current from streaming backward when the external power source is charging the battery rod of the electronic cigarette.

In this embodiment, the control module further comprises a second diode, the cathode of the second diode is connected to the voltage boost control circuit, the anode of the second diode is connected to the positive pole of the built-in battery, the second diode is configured to prevent the current from streaming backward when the built-in battery is charging the battery rod of the electronic cigarette.

In this embodiment, the charge managing module further comprises charge indicating lamps connected to the charge managing circuit chip. The charge indicating lamps comprise a first indicating lamp and a second indicating lamp, they are configured to light in turn in and after the charging process in order to realize the ability of changing lamp when full charged, and thus indicating the charge status of the built-in battery. The first indicating lamp is connected to the fifth pin of the charge managing circuit chip VA7204 and it is configured to indicate with light when the built-in battery is full charged; the second indicating lamp is connected to the first pin of the charge managing circuit chip VA7204 and it is configured to indicate with light when the built-in battery is in the charging process.

In a further embodiment, the control module further comprises a second diode and a power source managing circuit connected to the voltage boost control circuit, the anode of the second diode is connected to the positive pole of the built-in battery, the cathode of the second diode is connected to the power source managing circuit, the power source managing circuit is connected to the second interface via the voltage boost control circuit.

In this embodiment, the voltage boost control circuit comprises a voltage boost chip, a second resistor, a second inductor, a second capacitor and a third diode; the port SW of the voltage boost chip is electronically connected to the anode of the third diode, and is further electronically connected to one end of the second capacitor and the second interface via the third diode; the second resistor and the second inductor are connected in series sequentially between the voltage input port of the voltage boost chip and the anode of the third diode. The model of the voltage boost chip is CP2121.

In another example of this embodiment, the voltage boost control circuit comprises a PWM control signal port, a third inductor, a MOS transistor, a third resistor and a fifth diode, the PWM control signal port is connected to the gate of the MOS transistor via the third resistor, the voltage input port of the voltage boost circuit is connected to the drain of the MOS transistor via the third inductor, the drain of the MOS transistor is connected to the anode of the fifth diode and further outputs to the second interface via the fifth diode.

In this embodiment, the power source managing circuit comprises an over-voltage detecting module and a microprocessor chip, the microprocessor chip is connected to the over-voltage detecting module and the voltage boost control circuit respectively, the over-voltage detecting module is configured to detect the charging voltage at the second interface, the microprocessor chip is configured to turn off the voltage boost control circuit to stop the charging operation at the second interface if the detected result is higher than a preset voltage. The model of the microprocessor chip is SN8P2711BAG.

In this embodiment, the power source managing circuit further comprises an over-current detecting module connected to the microprocessor chip, the over-current detecting module is configured to detect the charging current at the second interface, the microprocessor chip is configured to turn off the voltage boost control circuit to stop the charging operation at the second interface if the detected result is higher than a preset current.

The following beneficial effects will be achieved when implementing the USB charger for the electronic cigarette in the present application. The battery rod in the electronic cigarette can be charged by the external source, and at the same time, the built-in battery 30 in the USB charger can be charged as well. If there is no external power source, the built-in battery can charge the battery rod directly. Therefore, users can be satisfied even if there is no external source. Thus, the user experience is improved to meet the user's consuming demand better.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENTS

To make the objects, technical schemes and advantages more clearly, the present application may be further described in detail with reference to the accompanying drawings and embodiments.

In the embodiments of the present application, the USB charger for the electronic cigarette is configured to charge the battery rod in the electronic cigarette.

Figure 1:
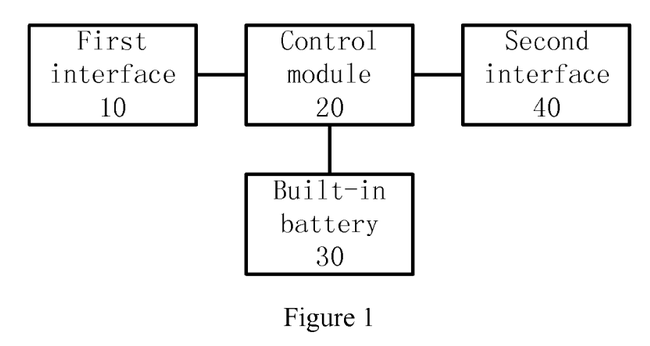
FIG. 1 is a structural diagram of a first embodiment for a USB charger for an electronic cigarette.

Referring to FIG. 1, a structural diagram of a first embodiment for the USB charger for the electronic cigarette is shown. In the embodiment, the USB charger for the electronic cigarette is configured to charge the battery rod in the electronic cigarette. The USB charger for the electronic cigarette comprises a control module 20, a first interface 10, a built-in battery 30 and a second interface 40, the first interface 10, the built-in battery 30 and the second interface 40 are connected to the control module 20.

The first interface 10 is configured to connect an external power source so as to provide a power supply. The second interface 40 is configured to connect a battery rod of an external electronic cigarette. The control module 20 is configured to charge the battery rod of the electronic cigarette and the built-in battery 30 simultaneously by using the external power source, or control the built-in battery 30 to charge the battery rod of the electronic cigarette, based on the access state of the external power source at the first interface 10.

Wherein, the external power source is connected to the USB charger via the first interface, and it charges the built-in battery 30 via the control module 20 and charges the battery rod via the second interface. Besides, if there isn't any external power source connected to the first interface 10, the built-in battery 30 will charge the battery rod in the electronic cigarette via the second interface 40.

Figure 2:
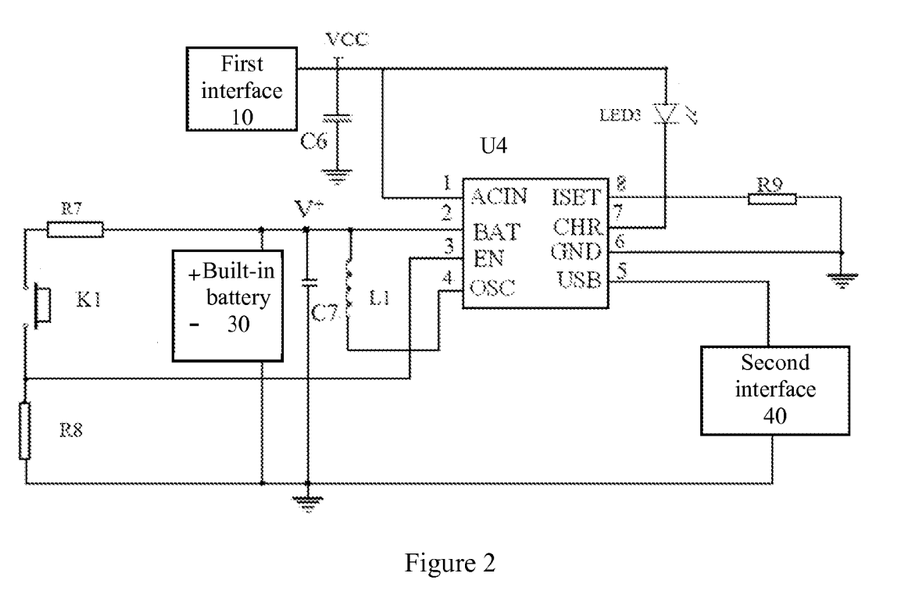
FIG. 2 is a circuitry of a detailed embodiment for the USB charger for an electronic cigarette shown in FIG. 1.

Referring to FIG. 2, in a first embodiment, the control module 20 mainly comprises a control chip U4, and preferably the model of the control chip is BL8579. The adapter source access port of the chip U4 is connected to the first interface 10, and at the same time, it is connected to the ground via a capacitor C6. The lithium battery access port of the chip U4, namely the second pin, is connected to the positive pole of the built-in battery, and it is also connected to one end of a capacitor C7. The other end of the capacitor C7 is connected to the negative pole of the built-in battery 30. A first inductor L1 is connected between the second pin and the forth pin of the chip U4, wherein the forth pin is the inductor access port of the chip U4. The USB output port of the chip U4 is connected to the second interface 40. The current set port, namely the fifth pin of the chip BL8579, is connected to the ground via a current-limiting resistor R9. Specifically, the resistance value of the resistor R9 can be set to define the amount of the charging current output at the second interface 40. 1 Kohm is corresponding to a charging current that equals to 1 A. In the embodiment, the external power source charges the built-in battery through the chip U4 and the first interface 10, and the chip U4 outputs charge voltage to the second interface 40 from its USB output port simultaneously. Besides, in the embodiment, the lithium battery access port of the chip U4 is also connected to the ground via a voltage-dividing resistor R7 and a protecting resistor R8, and the voltage-dividing resistor R7 and the protecting resistor R8 are connected in series. One end of the protecting resistor R8 is connected to the ground, the other end of the protecting resistor R8 is connected to the voltage boost enabling port EN, namely the third pin of the chip U4. A charging switch K1 is set between the voltage-dividing resistor R7 and the protecting resistor R8. The switch K1 is triggered by the battery rod in the electronic cigarette which is inserted into the second interface 40. When the battery rod is access, the K1 is close, and the chip U4 will output a charging voltage. After the battery rod is pulled out from the second interface 40, the K1 is open, and the chip U4 will stop to output the charging voltage. If there isn't any external power source connected to the first interface 10, the built-in battery 30 will charge the battery rod in the electronic cigarette via the chip U4 when the battery rod is inserted into the second interface 40.

Figure 3:
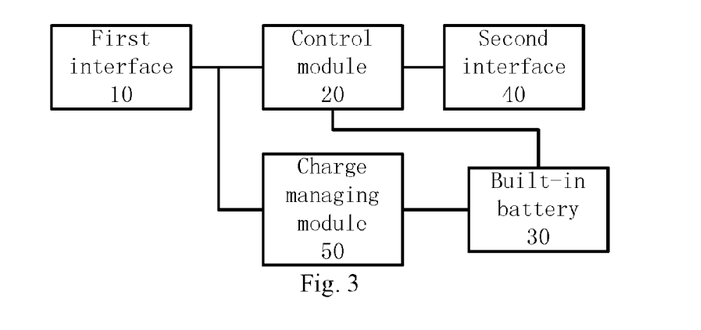
FIG. 3 is a structural diagram of a second embodiment for a USB charger for an electronic cigarette.

Referring to FIG. 3, in a second embodiment, besides the control module 20 and the first interface 10, the second interface 40 and the built-in battery 30 which are connected to the control module 20 respectively, the USB charger for the electronic cigarette further comprises a charge managing module 50. The charge managing module 50 is connected to the first interface 10 and the built-in battery 30 respectively, and it is configured to control the external power source to charge the built-in battery 30. When implementing the USB charger for the electronic cigarette in the present application, the external power source is access via the first interface 10. In this case, the external power source provides a power supply to the battery rod in the electronic cigarette via the control module 20, and it also charges the built-in battery 30 via the charge managing module 50. If there isn't any external power source connected to the USB charger, the built-in battery 30 outputs a charging voltage to the control module 20, and then the control module 20 charges the battery rod of the electronic cigarette via the second interface 40.

Figure 4:
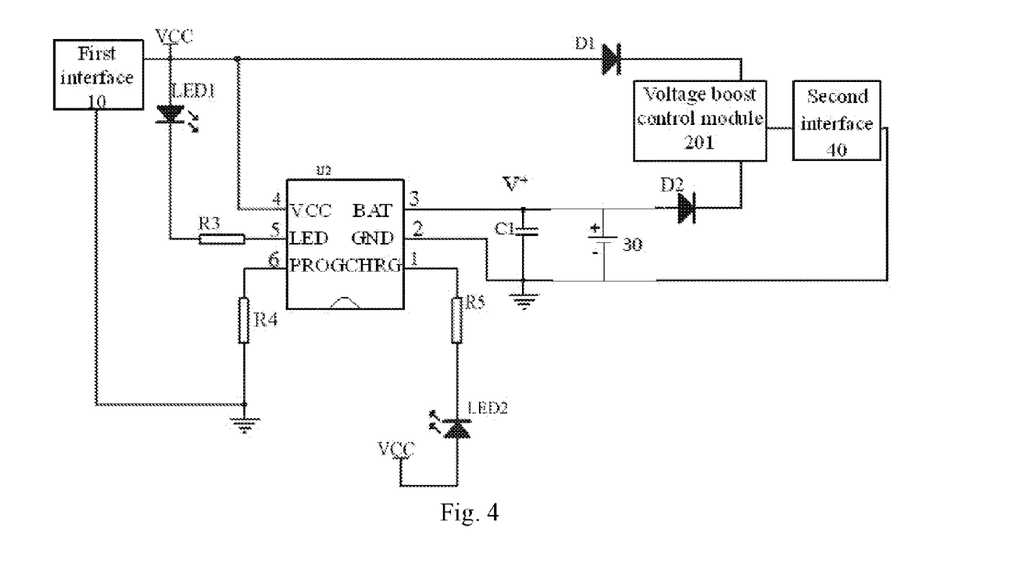
FIG. 4 is a circuitry of a detailed embodiment for the USB charger for an electronic cigarette shown in FIG. 3.

Referring to FIG. 4, in the second embodiment, the charge managing module 50 comprises a charge managing circuit chip U2 and a first capacitor C1. The port BAT of the charge managing circuit chip U2 is electronically connected to one end of the first capacitor C1 and the positive pole of the built-in battery 30. The other end of the first capacitor C1 is connected to the negative pole of the built-in battery 30.

Further, in the embodiment, charge indicating lamps are provided, which are connected to the charge managing circuit chip U2. The charge indicating lamps comprise a first indicating lamp LED1 and a second indicating lamp LED2, they are configured to light in turn in or after the charging process in order to realize the ability of changing lamp when full charged, and thus indicating the charge status of the built-in battery 30.

Preferably, in the USB charger for the electronic cigarette of the present application, the charge managing circuit chip U2 may be a chip VA7204, made by Vimicro Corp., Beijing, China. Referring to FIG. 4, the first pin is a first charge status output pin, which is connected to a voltage-dividing-and-current-limiting resistor R5 and a second indicating lamp LED2, wherein the R5 and the LED2 are connected in series. The fifth pin is a second charge status output pin, which is connected to a second voltage-dividing-and-current limiting resistor R3 and a first indicating lamp LED 1, wherein the R3 and the LED 1 are connected in series. The positive pole of the LED1 and the positive pole of the LED2 are both connected to a chip supply voltage VCC for the chip VA7204. The negative poles of the LED1 and the LED 2 are separately connected to the chip U2 separately via the voltage-dividing-and-current-limiting resistors R3 and R5. When charging the built-in battery 30, a MOS transistor in the chip VA7204 pulls down the first pin, the second indicating lamp LED2 lights. When the built-in battery 30 is full charged, the MOS transistor in the chip is in a high-impedance state, so the second indicating lamp LED2 goes out. The first indicating lamp LED1 is connected to the fifth pin of the charge managing circuit chip VA7204, in the charging process, a MOS transistor in the chip is in a high-impedance state, so the first indicating lamp keeps to go out. After the charging process, the MOS transistor in the chip pulls down the fifth pin, so the first indicating lamp LED1 lights to indicate with light when the built-in battery 30 is full charged. When the LED1 and the LED2 light in turn, the ability of changing lamp when full charged can be realized, and thus effectively indicating the charge status of the built-in battery 30. The second pin of the chip VA7204 is a ground port. The third pin of the chip VA7204 is a charging current output port which is configured to afford charging current to the built-in battery 30 and control to keep the charging voltage at a constant voltage such as 4.2V. The forth pin is a power source input pin, which is connected to the chip supply voltage VCC to supply power to the chip. Generally, the chip supply voltage VCC is defined within 4.25V-6V, preferably 5V. In the embodiment, the supply voltage VCC is acquired from the first interface 10. The sixth pin is configured to adjust the charging current, and the charging current can be defined through a resistor connected between the sixth pin and the ground. When the chip is in a charging-with-constant-current state, the voltage level at the sixth pin is defined to 1V. The sixth pin also can be regarded as a charge switch pin, the charger will come into an off mode when the sixth pin is not connected to the ground, and thus stop charging. In this case, the current input to the chip falls below 25 uA. Therefore, the external source, such as a notebook, a portable source and the like, supplies power to the chip U2 to provide the supply voltage VCC when it is connected to the first interface 10, and the charging process for the built-in battery 30 is controlled by the chip U2.

Figure 5:
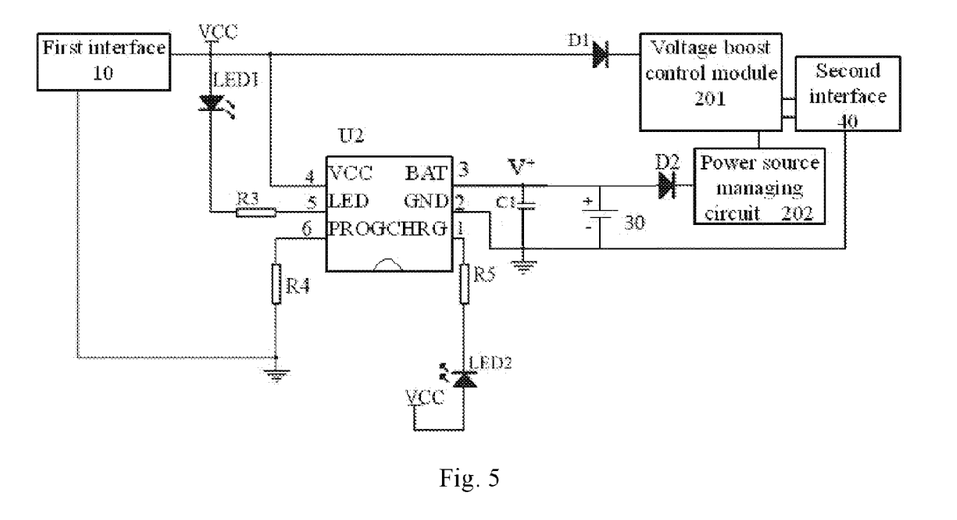
FIG. 5 is a structural diagram of a third embodiment for a USB charger for an electronic cigarette.

Referring to FIG. 5, a third embodiment is shown. Compared to the USB charger for the electronic cigarette shown in FIG. 4, in the present embodiment, the power source managing circuit 202 controls the voltage boost control module 201 to output a charge voltage to the second interface 40. To prevent the current from streaming backward in the charging process. A second diode D2 is connected between the built-in battery and the power source managing circuit 202. The anode of the second diode D2 is connected to the positive pole of the built-in battery 30, and the cathode of the second diode D2 is connected to the power source managing circuit 202. Similarly, the anode of the first diode D1 is connected to the first interface 10, and the cathode of the first diode D1 is connected to the voltage boost control module 201. When the external power source is connected to the first interface 10, the built-in battery 30 is charged by the charge control circuit chip U2. Besides, the voltage at the first interface 10 is delivered to the voltage boost control module 201 via the first diode D1, and then the voltage boost control module 201 outputs a charge voltage to the second interface 40 under the control of the power source managing circuit 202, so as to charge the battery rod in the electronic cigarette which is inserted into the second interface 40. The first diode D1 is configured to prevent the current from streaming backward when the external power source is charging the battery rod in the electronic cigarette. In like manner, the second diode D2 is configured to prevent the current from streaming backward when the built-in battery 30 is charging the battery rod in the electronic cigarette. The positive pole of the built-in battery 30 is connected to the power source managing circuit 202 via the second diode D2. When the battery rod in the electronic cigarette and the built-in battery 30 are both charged by the external power source via the first interface 10, the third pin of the chip U2 outputs the charging voltage to the positive pole of the built-in battery 30. When there isn't any external power source connected, the built-in battery 30 is connected to the second interface 40 via the second diode D2, the source managing circuit 202 and the voltage boost control module 201, and then the built-in battery 30 charges the battery rod in the electronic cigarette which is connected to the second interface 40. In the embodiment, the power source managing circuit 202 is configured to control the voltage boost control module 201.

Figure 6:
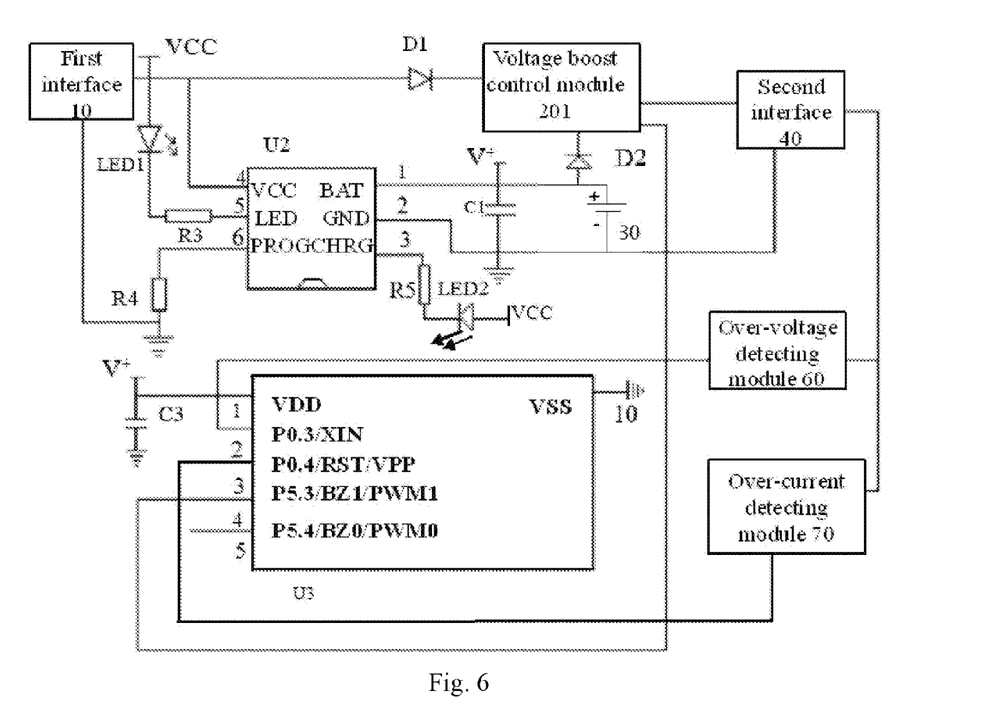
FIG. 6 is a circuitry of a detailed embodiment for the USB charger for an electronic cigarette shown in FIG. 5.

Referring to FIG. 6, a circuitry of a detailed embodiment for the USB charger for an electronic cigarette shown in FIG. 5 is presented. The power source managing circuit 202 comprises an over-voltage detecting module 60 connected to the second interface 40, and a microprocessor chip U3 connected to the over-voltage detecting module 60 and the voltage boost control circuit 201 respectively. The over-voltage detecting module 60 is configured to detect the charging voltage at the second interface 40, the microprocessor chip U3 is configured to turn off the voltage boost control circuit 201 to stop the charging operation at the second interface 40 if the detected result is higher than a preset voltage. The model of the microprocessor chip U3 is SN8P2711BAG, made by Sonix Technology Co., Ltd., Taiwan. The power supply pin of the chip U3, namely the first pin of U3, is connected to the positive pole of the built-in battery 30. the second pin of the chip U3, namely an input pin P0.3, is connected to the over-voltage detecting module 60. The first pin is a power source input port VDD connected to the ground via a third capacitor C3. The forth pin is a PWM1 control output port, which outputs a PWM control signal to the voltage boost control module 201. The tenth pin of the chip U3 is connected to the ground. Preferably, the third pin of U3, namely an input pin P0.4, is connected to the second interface 40 via an over-current detecting module 70. The over-current detecting module 70 is configured to detect the charging current at the second interface 40 and deliver the detected result to the chip U3. The third pin of U3 is configured to turn off the voltage boost control circuit 201 if the detected result is higher than a preset current. It should be understood that the power source managing circuit 202 may comprise any one of the over-voltage detecting module 60 and the over-current detecting module 70. The voltage boost control module 201 is controlled based on the current detected by the over-current detecting module 70 or the voltage detected by the over-voltage detecting module 60. It also should be understood that the detecting point of the over-voltage detecting module 60 or the over-current detecting module 70 is not limited to the output port of the second interface 40, but can be the output port of the voltage boost control module 201 (the input port of the second interface) or the input port of the voltage boost control module 201 and the like as well.

Figure 7:
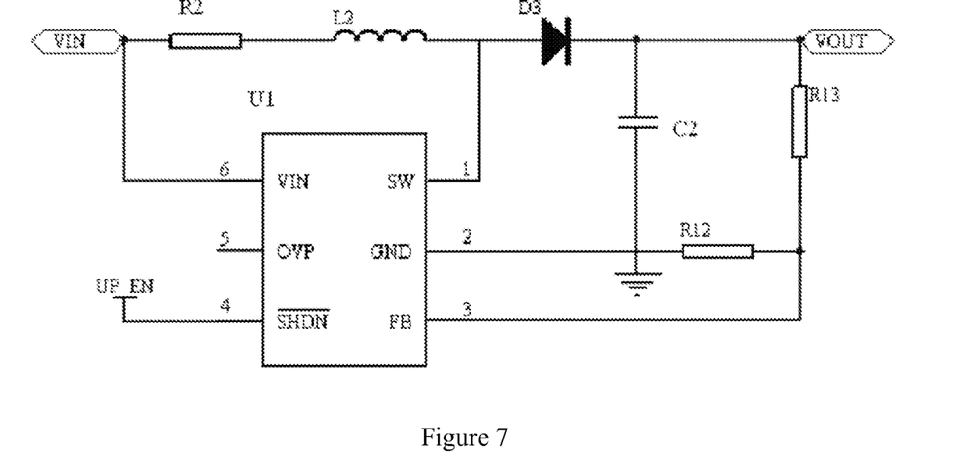
FIG. 7 is a circuitry of a first embodiment for a voltage boost control module in a USB charger for an electronic cigarette.

Referring to FIG. 7, a first embodiment of the voltage boost control circuit 201 is shown. The voltage boost control circuit 201 comprises a voltage boost chip U1, a second resistor R2, a second inductor L2, a second capacitor C2 and a third diode D3. The port SW of the voltage boost chip U1 is electronically connected to the anode of the third diode D3, and is further electronically connected to one end of the second capacitor C2 and the second interface 40 via the third diode D3. The second resistor R2 and the second inductor L2 are connected in series sequentially between the voltage input port VIN of the voltage boost chip U1 and the anode of the third diode D3. In the embodiment, the model of the voltage boost chip U1 is CP2121 made by Chiphomer Technology LTD., Shanghai, China. In other embodiments, the model of U1 can be MT3608 and the like. Referring to FIG. 7, the first pin of U1 is a switch pin, the second pin is a ground pin, the third pin is a feedback voltage pin, the forth pin is a enabling pin. The chip U1 starts to work when the voltage at the forth pin is higher than 1.4V and enters an off state when the voltage at the forth pin is lower than 0.4V. The fifth pin is an over-voltage protecting pin, the sixth pin is a chip operating voltage pin.

Referring to FIG. 7, the first pin of U1 is connected to one end of the inductor L2 and the anode of D3. The other end of L2 is connected to one end of R2, and the other end of R2 is connected to the port VIN and connected to the sixth pin. The second pin is connected to the ground and connected to one end of C2. The other end of C2 is connected to the cathode of D3 and connected to the port VOUT. One end of the resistor R12 is connected to the ground and the second pin of U1. One end of the resistor R13 is connected to the port VOUT and the cathode of D3, and the other end of R13 is connected to the other end of R12 and the third pin. The forth pin is connected to the enabling voltage afford port UP_EN. Wherein, the port VIN is connected to an input voltage, such as the cathode of D1 in the first embodiment of the USB charger for the electronic cigarette. The port VOUT is connected to the second interface 40.

Figure 8:
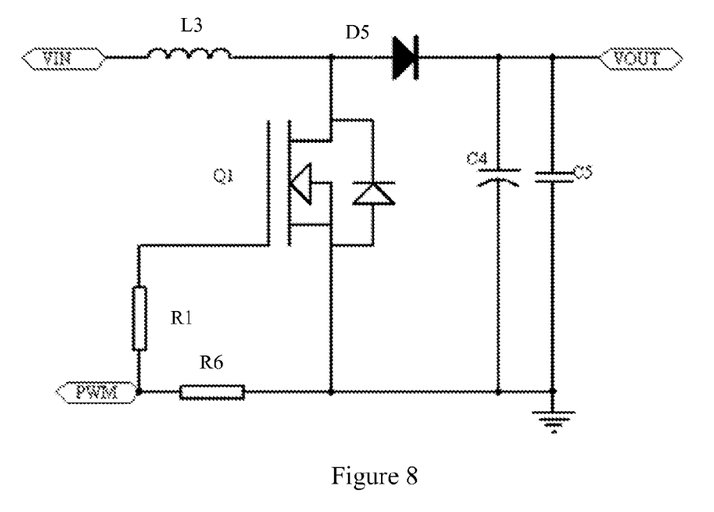
FIG. 8 is a circuitry of a second embodiment for a voltage boost control module in a USB charger for an electronic cigarette.

Referring to FIG. 8, a second embodiment of the voltage boost control circuit is shown. In the second embodiment, the voltage boost control circuit is presented as a PWM voltage boost circuit. It comprises a MOS transistor Q1, a resistor R6, a resistor R1, a capacitor C4, a capacitor C5, an inductor L3 and a fifth diode D5. The gate of Q1 is connected to the port PWM via R1, the source of Q1 is connected to the ground and connected to the port PWM via R6, the drain of Q1 is connected to one end of L3 and the anode of D5. The other end of L3 is connected to the port VIN. The cathode of D5 is connected to the positive pole of C4, one end of C5, and the port VOUT. The negative pole of C4 is connected to the ground. The other end of C5 is connected to the ground.

Wherein, the port VIN is connected to an input voltage, such as the cathode of D1 in the second embodiment of the USB charger for the electronic cigarette. The port VOUT is connected to the second interface 40.

The PWM control signal port is a pulse signal output port of the microprocessor chip U3. Preferably, the control module 20 comprises a chip with the ability of outputting PWM. The control module 20 detects the actual charging voltage and charging current, and controls the on-and-off state of Q1 through adjusting the duty cycle of the pulse signal outputted from the pulse signal output port, so as to adjust the charging voltage.

The USB charger for the electronic cigarette further comprises an over-voltage detecting module 60 connected to the control module 20. The over-voltage detecting module 60 is configured to detect the charging voltage. If the detected result is higher than a preset voltage, the charging circuit that the over-voltage detecting module 60 resides in is controlled to be cut off.

Figure 9:
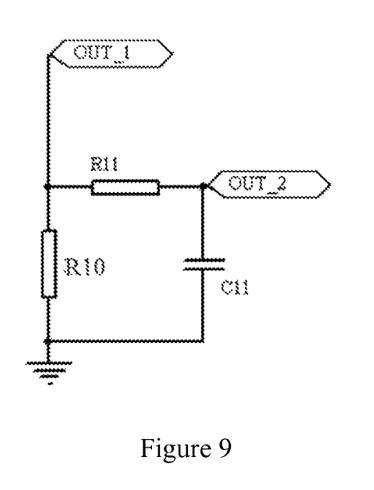
FIG. 9 is a circuitry for a voltage detecting module in a USB charger for an electronic cigarette.

Referring to FIG. 9, an over-voltage detecting module is shown. The over-voltage detecting module is configured to detect the voltage of the charging circuit in the USB charger for the electronic cigarette, and deliver the detected result to the control module 20. The control module 20 is configured to cut off the charging circuit if the detected voltage is higher than the preset voltage. Preferably, in the embodiment, based on the method of dividing voltage through resistors, the over-voltage detecting module can detect the voltage when the USB charger is charging the battery rod in the electronic cigarette and/or the voltage when the built-in battery 30 in the USB charger is being charged. The over-voltage detecting module 70 comprises a resistor R11, a resistor R10 and a capacitor C11. One end of R11 is connected to R10 and connected to the port OUT_1, the other end of R11 is connected to the positive pole of C11 and connected to the port OUT_2. One end of R10 is connected to the port OUT_1, the other end of R10 is connected to the ground. One end of C11 is connected to the port OUT_2, the other end of C11 is connected to the ground. The port OUT_1 is the positive end of the battery rod that is to be charged, and the port OUT_2 is the charging current or charging voltage detecting end. The voltage on the resistor R10, which is detected at the port OUT_2, can be regarded as the charging voltage. In another example, the charging current can be calculated based on the voltage on the resistor R11. Preferably, in the embodiment, the over-current detecting module 70 can use the circuit shown in FIG. 9 as well. The charging current can be calculated based on the voltage on the resistor R11, and the voltage on R11 can be detected at the port OUT_2 in FIG. 9. When the circuit is over-current, the control module 20 will cut off the charging circuit.

The USB charger further comprises a low voltage detecting module (not shown) connected to the microprocessor chip U3. The low voltage detecting module is configured to detect the voltage of the charging circuit in the USB charger for the electronic cigarette and deliver the detected result to the control module 20. The control module 20 is configured to cut off the charging circuit if the detected charging voltage is lower than a preset voltage. Preferably, the low voltage detecting module is based on the same theory as the over-voltage detecting module described above, namely the method of dividing voltage through resistors, in order to detect whether the voltage in the charging process is lower than the preset threshold. If it is lower than the preset threshold, the charging process is stopped.

The control module 20 can control the circuits in the USB charger according to the voltage detected by the over-voltage detecting module and the current detected by the over-current detecting module, in order to carry out the over-voltage protection and the over-current protection for its charging circuit. And the control module 20 can carry out the low voltage protection for the built-in battery 30 and the battery rod inserted into the second interface based on the result detected by the low voltage detecting module.

Implementing the USB charger for the electronic cigarette in the present application, the battery rod in the electronic cigarette can be charged by the external power source, and at the same time, the built-in battery 30 in the USB charger can be charged as well. The USB charger has the ability of changing lamp when full charged, so as to effectively indicate the charge status. If there is no external power source, the built-in battery 30 can charge the battery rod as soon as the battery rod is connected to the USB charger. Therefore, the USB charger can charge the electronic cigarette in an emergency, which may bring convenience and good experience to users. And it is convenient and fast that the built-in battery 30 in the USB charger is charged automatically when the electronic cigarette is charged by the external source.

While the embodiments of the present application have been described with reference to the drawings, the present application will not be limited to above embodiments that are illustrative but not limitative. It will be understood by those skilled in the art that various changes and equivalents may be substituted in the light of the present application without departing from the scope of the present application, and those various changes and equivalents shall fall into the protection of the application.

What is claimed is:

1. A USB charger for an electronic cigarette, which comprises a first interface, a control module and a second interface, wherein the USB charger further comprises a built-in battery, the control module is connected to the first interface, the second interface and the built-in battery respectively; the first interface is configured to connect an external power source so as to provide a power supply; the second interface is configured to connect a battery rod of an external electronic cigarette; the control module is configured to charge the battery rod of the electronic cigarette and the built-in battery simultaneously by using the external power source, or control the built-in battery to charge the battery rod of the electronic cigarette, based on the access state of the external power source at the first interface; wherein the control module comprises a voltage boost control circuit and a diode the voltage boost control circuit is connected to the second interface, the anode of the diode (D1) is connected to the first interface, the cathode of the diode (D1) is connected to the voltage boost control circuit, the diode (D1) is configured to prevent the current from streaming backward when the external power source is charging the battery rod of the electronic cigarette wherein the voltage boost control circuit comprises a voltage boost chip, a resistor (R2), an inductor (L2), a capacitor (C2) and a diode (D3): a port (SW) of the voltage boost chip is electronically connected to the anode of the diode (D3), and is further electronically connected to one end of the capacitor (C2) and the second interface via the diode (D3): the resistor (R2) and the inductor (L2) are connected in series sequentially between a voltage input port of the voltage boost chip and the anode of the diode (D3).

2. The USB charger for an electronic cigarette according to claim 1, wherein the control module further comprises a diode (D2), the cathode of the diode (D2) is connected to the voltage boost control circuit, the anode of the diode (D2) is connected to the positive pole of the built-in battery, the diode (D2) is configured to prevent the current from streaming backward when the built-in battery is charging the battery rod of the electronic cigarette.

3. The USB charger for an electronic cigarette according to claim 1, wherein the control module further comprises a diode (D2) and a power source managing circuit, the power source managing circuit is connected to the voltage boost control circuit, the anode of the diode (D2) is connected to the positive pole of the built-in battery, the cathode of the diode (D2) is connected to the power source managing circuit, the power source managing circuit is connected to the second interface via the voltage boost control circuit.

4. The USB charger for an electronic cigarette according to claim 3, wherein the power source managing circuit comprises an over-voltage detecting module and a microprocessor chip, the microprocessor chip is connected to the over-voltage detecting module and the voltage boost control circuit respectively, the over-voltage detecting module is configured to detect the charging voltage at the second interface, the microprocessor chip is configured to turn off the voltage boost control circuit to stop the charging operation at the second interface if the detected result is higher than a preset voltage.

5. The USB charger for an electronic cigarette according to claim 4, wherein the power source managing circuit further comprises an over-current detecting module connected to the microprocessor chip, the over-current detecting module is configured to detect the charging current at the second interface, the microprocessor chip is configured to turn off the voltage boost control circuit to stop the charging operation at the second interface if the detected result is higher than a preset current.

6. The USB charger for an electronic cigarette according to claim 1, wherein it further comprises a charge managing module that is connected between the first interface and the built-in battery; when the first interface is connected to the external power source, the external power source is outputted to the control module via the first interface to provide the power supply to the battery rod in the electronic cigarette, and the charge managing module is configured to control charging current to charge the built-in battery; when there isn't any external power source connected to the first interface, the built-in battery charges the battery rod of the electronic cigarette directly via the control module.

7. The USB charger for an electronic cigarette according to claim 6, wherein the charge managing module comprises a charge managing circuit chip and a capacitor, (C1); a port (BAT) of the charge managing circuit chip is electronically connected to one end of the capacitor, (C1); and the positive pole of the built-in battery; the other end of the capacitor (C1) is connected to the negative pole of the built-in battery.

8. The USB charger for an electronic cigarette according to claim 7, wherein the charge managing module further comprises charge indicating lamps connected to the charge managing circuit chip.

9. The USB charger for an electronic cigarette according to claim 8, wherein the charge indicating lamps comprise a first indicating lamp and a second indicating lamp, the first indicating lamp and the second indicating lamp are configured to alternately light up in or after the charging process in order to realize the ability of changing lamp when full charged, and thus indicating the charge status of the built-in battery.

10. The USB charger for an electronic cigarette according to claim 9, wherein the first indicating lamp is electrically connected to an output pin of the charge managing circuit chip and it is configured to indicate with light when the built-in battery is full charged; the second indicating lamp is electrically connected to the first pin of the charge managing circuit chip and it is configured to indicate with light when the built-in battery is in the charging process.

11. A USB charger for an electronic cigarette, which comprises a first interface, a control module and a second interface, wherein the USB charger further comprises a built-in battery, the control module is connected to the first interface, the second interface and the built-in battery respectively; the first interface is configured to connect an external power source so as to provide a power supply; the second interface is configured to connect a battery rod of an external electronic cigarette; the control module is configured to charge the battery rod of the electronic cigarette and the built-in battery simultaneously by using the external power source, or control the built-in battery to charge the battery rod of the electronic cigarette, based on the access state of the external power source at the first interface; wherein the control module comprises a voltage boost control circuit and a first diode, the voltage boost control circuit is connected to the second interface, the anode of the first diode is connected to the first interface, the cathode of the first diode is connected to the voltage boost control circuit, the first diode is configured to prevent the current from streaming backward when the external power source is charging the battery rod of the electronic cigarette; wherein the voltage boost control circuit comprises a PWM control signal port, a inductor (L3), a MOS transistor, a resistor (R1) and a diode (D5), the PWM control signal port is connected to the gate of the MOS transistor via the resistor (R1), a voltage input port of the voltage boost control circuit is connected to the drain of the MOS transistor via the inductor (L3), the drain of the MOS transistor is connected to the anode of the diode (D5) and to the second interface via the diode (D5).

12. The USB charger for an electronic cigarette according to claim 11, wherein it further comprises a charge managing module that is connected between the first interface and the built-in battery, when the first interface is connected to the external power source, the external power source is outputted to the control module via the first interface to provide the power supply to the battery rod in the electronic cigarette, and the charge managing module is configured to control charging current to charge the built-in battery; when there isn't any external power source connected to the first interface, the built-in battery charges the battery rod of the electronic cigarette directly via the control module; wherein the charge managing module comprises a charge managing circuit chip and a capacitor, (C1); a port (BAT) of the charge managing circuit chip is electronically connected to one end of the capacitor (C1) and the positive pole of the built-in battery; the other end of the capacitor (C1) is connected to the negative pole of the built-in battery.

13. The USB charger for an electronic cigarette according to claim 11, wherein the control module further comprises a diode (D2), the cathode of the diode (D2) is connected to the voltage boost control circuit; the anode of the diode (D2), is connected to the positive pole of the built-in battery; the diode (D2), is configured to prevent the current from streaming backward when the built-in battery is charging the battery rod of the electronic cigarette.

14. The USB charger for an electronic cigarette according to claim 11, wherein the control module further comprises (D2) and a power source managing circuit, the power source managing circuit is connected to the voltage boost control circuit; the anode of the diode (D2) is connected to the positive pole of the built-in battery; the cathode of the diode (D2) is connected to the power source managing circuit; the power source managing circuit is connected to the second interface via the voltage boost control circuit.

15. The USB charger for an electronic cigarette according to claim 14, wherein the power source managing circuit comprises an over-voltage detecting module and a microprocessor chip, the microprocessor chip is connected to the over-voltage detecting module and the voltage boost control circuit respectively, the over-voltage detecting module is configured to detect the charging voltage at the second interface, the microprocessor chip is configured to turn off the voltage boost control circuit to stop the charging operation at the second interface if the detected result is higher than a preset voltage;

wherein the power source managing circuit further comprises an over-current detecting module connected to the microprocessor chip, the over-current detecting module is configured to detect the charging current at the second interface, the microprocessor chip is configured to turn off the voltage boost control circuit to stop the charging operation at the second interface if the detected result is higher than a preset current.

\* \* \* \* \*